United States Patent [19]

Chartet

[11] 3,852,873

[45] Dec. 10, 1974

[54] METHOD FOR MANUFACTURING AND BRAZING VARIOUS APPARATUSES AND PARTICULARLY HEAT EXCHANGERS

[75] Inventor: Andre Chartet, Meudon, France

[73] Assignee: Societe Anonyme des Usines Chausson, Asnieres, France

[22] Filed: May 18, 1973

[21] Appl. No.: 361,405

[30] Foreign Application Priority Data

May 23, 1972 France .............................. 72.18338

[52] U.S. Cl...................... 29/487, 29/157.3, 29/488
[51] Int. Cl............................................. B23k 31/02
[58] Field of Search........ 148/159; 29/157.3 C, 487, 29/488, 157.3 R

[56] References Cited

UNITED STATES PATENTS 2,837,450   6/1958   Moore et al. ................... 148/159 X

*Primary Examiner*—Gerald A. Dost
*Attorney, Agent, or Firm*—Flynn & Frishauf

[57] ABSTRACT

The apparatus is made of aluminium containing parts with a silicon and magnesium content able to form a $Mg_2Si$ compound. The assembled apparatus coated with a brazing alloy is heated up to 580°C to 600°C and then quickly cooled.

19 Claims, No Drawings

METHOD FOR MANUFACTURING AND BRAZING VARIOUS APPARATUSES AND PARTICULARLY HEAT EXCHANGERS

The present invention relates to the manufacture of apparatuses made of aluminum and, more particularly to heat exchangers whose one of the circulation fluid is an aqueous fluid having the possibility to contain, in solution or in suspension, different chemical compounds which can cause corrosion.

The heat exchangers of that type, especially those utilized for cooling heat engines, contain liquids of which the temperature can be greater than 100°C. Those liquids are necessarily in contact whith metals of different kinds, for example with cylinder blocks made of cast-iron or of aluminium alloy of a different nature that those utilized for constituting the heat exchanger and, also, with cylinder head gaskets made of cupreous alloys and also with synthetic rubbers and also with different materials which, after a long use of the cooling liquid, will deposit in said liquid metallic chlorides and sulphates which are causes of corrosions which are added to the corrosions of galvanic origin which can also occur.

The modern heat exchangers, as the heat exchangers utilized with heat engines, must also be able to resist to erosion since the liquid to be cooled, in practically all cases, is pulsed at a relatively high speed by means of pumps in view of activating the cooling upon passing in the heat exchangers. Furthermore, the heat exchangers must be able to work under relatively high pressures, which can reach several bars or atmospheres.

The above explained conditions, of course, tend to look upon the utilization of aluminium alloys under relatively important thicknesses to simultaneously resist to the corrosion, erosion and pressure effects. However, this is not practically possible because, on one hand, the utilization of heat exchangers having thick walls would decrease the heat exchange capacities and above all, it would result therefrom a too high cost and then the heat exchangers, especially radiators made of aluminum for cars, could not be competitive in comparison with those already existing and which are made of cupreous or ferreous alloys.

Heat exchangers are constituted by parts: tubes, dissipators, tube-plates, header tanks and various tubes; which are manufactured by forming methods, such as stamping, cutting, rolling, etc. ..... which require the utilization of metals able to be easily submitted to said methods, in order to make the manufacture of the parts very accurately and then to provide brazing of the assembled parts without the presence of any leak at the level of the brazed joints, especially at the junctions, of the tubes with the tube-plates, of the tube-plates with the header tanks, and of the header tanks with the tubes.

Actually, the brazing aluminium alloys are generally very fluid alloys when being molten during the brazing process, and it is important that the connection between the parts by extremely accurate for the junctions to be entirely filled with brazing alloy.

It has also appeared that brazing alloys having a low melting point, for examples zinc mixtures, could not practically be utilized because electrical couples are then created, as soon as the heat exchanger is in presence of the atmospheric humidity. This leads to practically look upon brazing alloys constituted by aluminium-silicon alloys only, whose melting temperature is high, about 580°C. Consequently, the aluminium alloy having to constitute the heat exchanger parts must of course have a melting temperature substantially higher to enable the brazing process without a destroying of the parts.

The above conditions have shown that for easiness in forming the parts, especially to make easier their stamping, it would be apparently advantageous to utilize aluminium alloys containing also copper and other metals, as the alloys known under the name of $AM_1$ which contain about:

1 to 1.5% of manganese
0.2% of copper
0.05% of magnesium
0.6% of silicon
0.7% of iron
0.1% of zinc alloyed to aluminium.

However, it has appeared that such alloys could not be practically used, since the temperature they have to stand during the brazing process cause them to support an annealing which considerably decreases their mechanical properties, particularly their surface hardness and breaking strength which is at a level most of the time lower than 10 hectobars.

Besides, if the presence of copper seems prima facie interesting for stamping and rolling purposes and other shaping process, it has also appeared that the presence of copper within the alloy was considerably increasing the risks of corrosion.

Also for the same reasons other known alloys have been eliminated, such as those designated in the art under the reference AU, which designates aluminium and copper alloys. On the other hand, the alloys known under the names AG, which designates aluminium and magnesium alloys, and AZG which designates aluminium, zinc and magnesium alloys, have, some of them, melting temperature lower or too close to the melting temperature of the AlSi aluminium brazing alloy, which has made a requirement to keep them away.

Among other also known alloys such as that designated by AMG, which designates alloys containing manganese and magnesium; by ASG, which designates alloys containing aluminium, silicon and magnesium; and by ASGM, which designates alloys containing aluminium, silicon magnesium, and manganese, it has appeared that is was often difficult to use them in economical manufacturing, because after the brazing process they have relatively poor mechanical properties regarding their erosion and breaking strengths.

Applicant has then noticed that an AGS alloy, which indicates an alloy containing aluminium, magnesium and silicon, could show satisfactory characteristics if not containing copper contrarily to most of the known alloys of that type, but under the condition that after the brazing process ensuring the connection of the parts of the heat exchanger, the same be submitted to a new heat treatment providing the alloy to recover the essential of its mechanical properties it had before the brazing process. It is actually known in the art that such alloys of the AGS type can be hardened by precipitation of the magnesium-silicon binary compound, especially if said compound is in a low proportion in the alloy and is in the precipited form for the utilization temperatures of the heat exchangers.

Yet, it has appeared that the performance of heat treatments following a brazing process was leading to a considerable energetic consumption, consequently increasing the cost of the heat exchangers.

Besides, the alloys of the AGS type, normally having a relatively high hardness, cannot be easily stamped, thus preventing them until now to be used for the looked-upon manufacturing.

This invention has yet solved the above described problem in making possible a very accurate manufacture and a brazing of the heat exchangers without resulting in energic consumptions higher than those embodied, especially for the brazing process of the above considered $AM_1$ alloys parts.

According to the invention, the method for manufacturing and brazing heat exchangers is characterized by:

the parts of the heat exchanger are made from thin sheets of basic aluminium alloy containing silicon and magnesium able to form a $Mg_2Si$ compound, the heat exchanger is assembled and submitted to action of a cleaning solvent of the greasy products, the heat exchanger is heated in presence of a brazing aluminium alloy containing from 7% to 15% of silicon in presence of metals and metal salts causing removal of the oxides covering the basic alloy and wetting of said alloy by the brazing alloy, the heat exchanger is heated to a temperature within the range of 580° to 600°C, whereby at a same time silicide of magnesium $Mg_2Si$ is completely set in a supersaturated state solution in the basic alloy keeping a solid state and the brazing alloy is molted and wets said basic alloy, as soon as wetting of said basic alloy by the brazing alloy is performed, the heat exchanger is rapidly cooled at a speed of at least 1°C per second substantially up to the ambient temperature, whereby the magnesium silicide of said basic alloy is kept in a supersaturation state while said brazing alloy is solidified and hardened, the heat exchanger is again heated up to a temperature at least equal to 180°C and at most equal to 250°C up to the point to cause a temper causing the magnesium silicide to precipitate while providing a hardening of said basic alloy, and the heat exchanger is lastly cooled back to the ambient temperature whereby the brazing of the parts constituting it is performed along with the heat treatment hardening the alloy constituting said heat exchanger.

Various other characteristics of the invention are shown in the following description.

The method of the invention is embodied as follows:

I Preparation of the basic alloy

Thin sheets, strips or bands made of an aluminium alloy are prepared, said alloy containing between 0.3 and 1.9% of silicon and magnesium able to form magnesium silicide as hardening element.

The alloy which has to be, in the application referred to in the invention, as cheap as possible, can also contain various impurities but the quantity of the same must however be limited; for example it may be admitted that the alloy contains up to 0.30% in weight of iron, 0.50% in weight of zinc, 0.50% in weight of manganese and also copper traces, but said traces as above explained must be very low, and as a general rule not be higher than 0.02%, the highest limit being 0.05%.

The sheets-the word "sheets" designating as well strips as bands-are utilized after having been submitted to a work-hardening process especially obtained upon laminating, said sheets are also softened or at least submitted to a partial restoration through a heat treatment at a relatively low temperature, for example by heating the same to a temperature within the range of 260° and 280°C. The softening process must be adjusted according to the type of the mechanical forming operations to which the sheets have to stand upon the manufacture of the parts of the heat exchangers. It is appropriate that the softening process be more complete for parts having to stand a deep stamping, for example for header-tanks, than for parts having to support precise cuttings, for example when louvre, straps or barbs have to be formed in the secondary heat exchanger elements.

In a general manner, it can be accepted that basic alloy sheets are at a quarter-hard level which corresponds to a breaking strength of 10 to 15 hectobars, said level could be adjusted by the man skilled in the Art depending on the special shape to be given to the parts and on the nature of the tooling to be used for this kind of work.

II Preparation of the brazing alloy

The brazing process is performed while using a brazing alloy constituted by an aluminium alloy containing from 7 to 13% in weight of silicon and possibly other additives, but care should be taken that said brazing alloy does not contain copper.

Among the suitable additives are alkaline metals such as boron and lithium and alkaline-earth metals which can be used in proportions comprised between 0.005% and 3% in weight of the whole brazing alloy. Zinc can also be utilized in a proportion of 0.1 to 12% in weight and also magnesium in a proportion of 0.01 to 10% in weight of the whole brazing alloy. Said additives can be used for several reasons but first of all they are designed to ease wetting of the basic alloy while decreasing the viscosity of the brazing alloy and also the melting temperature thereof.

Some of said additives described hereinabove, particularly magnesium, as well as other one as bismuth and antimony, can be used to reduce, even to avoid, treatment which are usually performed in the brazing process of aluminium alloy parts, and particularly the scraping and fluxing treatments.

The prepared brazing alloy can be used in different ways as known in the art, for example:

a. the brazing alloy can be cold or hot coated on the basic alloy, for example by making said brazing alloy and said basic alloy to reach a temperature of about 450°C and by laminating together a sheet of basic alloy and a sheet of brazing alloy.

b. the brazing alloy can also be deposited under the form of a paste on at least some portions of the parts made of basic alloy and before or after assembling the same.

c. the brazing alloy can also be brought, after assembling the parts made of basic alloy, through a flame spraying together with an anhydrous brazing flux.

All the other processes known in the Art can be used without any prejudice.

III Forming the parts

As explained in the above disclosure, the sheets made of basic alloy, coated or not coated with a brazing alloy are shaped, for example as follows:

The header-tanks, filling bases, lateral flanges and supporting parts of the heat exchanger are stamped.

The secondary heat exchange elements, particularly when said elements are constituted in the form of corrugated strips, are made through cutting and folding.

The tubes are made through rolling and drawing.

Other technics can be utilized in the same way, as the embossing and the extrusion for making special parts.

Some of the above operations, especially the embossing and the stamping have, as a secondary effect, to still work-harden the whole or portion of the formed parts.

After the forming and the eventual calibrating processes of the different parts, the same are assembled and mechanically connected together to be maintained in a respective correct position, which can be obtained either by designing different clamping between the parts or by welding some of said parts by electric welding points or by holding the same in a so-called brazing mounting.

The assembled heat exchangers are, then, submitted to a grease removal operation which is for example performed by passing in a bath composed of an organic solvent or by spraying a solvent which can be, for example, the trichloroethylene. A steam degreasing step can also be performed.

The above mentioned operations constitute a common trunk for the method of the invention which may be continued in various manners by realizing, at each time, simultaneously the properly so-called brazing of the assembled parts of the heat exchanger and a heat treatment of the basic alloy causing the same to acquire, as a consequence of said brazing, a high level of hardness.

In the following disclosure it is assumed that the basic alloy is covered through plating by the brazing alloy, the treatment operations being not modified when the brazing alloy is applied in an other manner.

When the brazing alloy is essentially constituted by an aluminium-silicon alloy, the heat exchangers are submitted to a scraping operation by passing them in an acid or alkaline bath, then they are rinsed with plain water and eventually dried in a stove. On the contrary, if the brazing alloy contains some of the above mentioned additives, then the scraping step is not necessary nor the rinsing and drying steps.

Afterwards, different methods can be embodied.

IV Oven brazing in presence of flux

In this case, the heat exchangers are submitted to an aqueous flux, through dipping or spraying, before they enter the oven, then they are dried in the oven in which they are afterwards progressively heated up to the melting temperature of the brazing alloy, i.e., up to about 580° to 600°C. The flux can also be deposited through flame spraying, which does not require any drying operation.

During the heating step, the basic alloy is submitted to a treatment having for its effect to put in solution into the aluminium, the binary compound constituted by the magnesium silicide $Mg_2Si$ which is preferably completely dissolved at the melting temperature of the brazing alloy.

The time duration to which the brazing alloy is maintained at the melting temperature is selected to be as short as possible, but nevertheless sufficient for said brazing alloy to run and suitably fill the interstices of the junctions to be brazed. This time depends thus partly on the form of the junction to be made.

In the case of a cooling radiator for cars, the time duration for holding the brazing alloy at the melting temperature, which is of 590°C for a brazing alloy containing 10% of silicon and 90% of aluminium, is generally of about one minute.

The heat exchangers are then very rapidly cooled without any idle period between the heating process causing the melting of the brazing alloy and the start of the accelerated cooling. This cooling can be caused with no difference, as follows:

1°-by blowing air or another gas through the heat exchanger in using a gas at a temperature for which a temperature decrease of the heat exchangers of at least 1°C per second is obtained; said blow cooling is continued until the temperature of the heat exchanger has been lowered at about 300°C. Said gas cooling is immediately followed by a cooling with water or another fluid, especially through a spraying of water directly on the heat exchangers which are thus cooled close to the ambient temperature.

The first cooling step through gas blowing has for its result to solidify and then harden the brazing alloy without causing a heat shock which would cause distortions of the parts. Simultaneously, taking into consideration the cooling speed, the formation of a thin cristallin structure is caused in the basic alloy, in which structure the magnesium silicide is kept in a supersaturation state with no possibility to precipitate although its equilibrium is un-stable. It is actually known that at a temperature of 300°C, the aluminium does really maintain in solution only 0.30% in weight of magnesium silicide.

The second step of the cooling process which follows without any solution of continuity the cooling by blowing step, has for its result to continue the tempering effect already started, i.e., to prevent precipitation of the magnesium silicide which is thus maintained in a supersaturation state up to the ambient temperature to which the heat exchangers are cooled. Besides, the brutal action of water or other fluid brought on the heat exchangers, when they are still at a temperature close to 300°C, causes a heat shock which is sufficient to crack and remove the flux remaining on the heat exchangers.

2°- through spraying water on the heat exchangers, first very slightly and then more and more abundantly, said water being eventually added with glycol or other additives reducing the heat adsorption capacity of the water, in view of limiting, at least at the beginning of the cooling process, the heat shock supported by the heat exchangers; for example the sprayed fluid can first of all be in an atomized form, then finely pulverized, and then roughly pulverized when the temperature has already been decreased in order to obtain the same effects as those described in the above disclosure.

After the tempering step and the cooling step up to reach the ambient temperature, as above described, the heat exchangers are brought in a washing bath, which is preferably constituted by an acid bath, for the removal of the flux remaining on the heat exchangers. Preferably, the washing bath is heated to a temperature of 50° to 60°C in order that the heat exchangers be progressively heated in the same time as they are washed. Then said heat exchangers are brought in a rinsing bath, for example a plain water bath which is preferably at a temperature higher than that of the acid bath, for example at about 80°C. The heat exchangers are lastly brought in a drying stove wherein their temperature is progressively raised between 180° and 240°C, the selected temperature depending on the maintaining time duration of the heat exchangers in said stove. Thus is obtained, besides the evaporation of the washing water and of the rinsing water, that the basic alloy of the heat exchanger will support a temper causing a precipitation of the magnesium silicide and, consequently, the hardening of said basic alloy.

It has been considered as important that the increase in temperature from the ambient temperature up to the selected threshold for the maximal temperature of the stove be very progressively made, it is the reason why washing and rinsing baths are advantageously utilized to cause this progressive increase in the temperature. It has then appeared that the maintaining time duration of the heat exchangers into the stove could be substantially reduced and the hardness of the alloy was then also greatly improved.

Depending on the desired hardness, the time during which the heat exchanger is maintained in the stove is increased and its temperature is decreased simultaneously. The best results are obtained by keeping the heat exchangers at the temperature of 185°C for about fiften hours after said temperature of 185°C has been progressively reached in 15 to 30 minutes. In that case for a basic alloy containing 0.50% in weight of magnesium and 0.40% in weight of silicon, a hardness level of 23 hectobars can then be obtained.

Very satisfactory hardness levels reaching 20 hectobars can however be obtained by very substantially reducing the tempering time, especially in progressively heating the heat exchangers up to the temperature of 220°C and in maintaining them at this temperature during about twenty minutes.

V. Bath brazing

As a variant of the embodiment described in the above disclosure, after an eventual degreasing and scraping, the heat exchangers can be pre-heated up to a temperature of about 540 to 560°C, for example in an oven, then immediately dipped in a fluxing salt both heated up to the melting temperature of the brazing alloy. The brazing is then performed, as previously, while the basic alloy is annealed to put in solution the magnesium silicide in the aluminium. Then, as soon as the heat exchangers are taken out from the bath, they are quickly cooled by one of the means mentioned above under 1° or 2°, to cause the same effects of: maintaining in a supersaturation state some magnesium silicide in the basic alloy; solidifying and hardening of the brazing alloy; and providing heat shock starting the removal of the driven flux. The following operations, after the tempering process, are remaining the same as the one mentioned above under IV.

VI. Oven brazing without any flux

Brazing without using flux is performed by using a brazing alloy containing, for example, 7 to 13% of silicon and by heating the heat exchangers in an oven up to the temperature for melting said alloy and for putting in solution the magnesium silicide in the basic alloy, i.e., a temperature close to 590°C. Said heating is made while maintaining, in the vicinity of the joints to be brazed, some magnesium at the metallic state and while creating, in the oven, a vacuum of about $10^{-4}$ mm of mercury, or yet while establishing therein a neutral atmosphere.

To bring magnesium under a metallic form in the vicinity of the junctions to be brazed, different possibilities can be utilized. Magnesium can be included into the brazing alloy which is then presented in the form of an aluminium alloy containing from 7 to 15% of silicon and 0.4 to 10% of magnesium. Said alloy has the particular characteristic to melt at about 551°C. It is also possible to bring the magnesium by diffusion under vacuum up to the junctions to be brazed on which it is condensated. The magnesium can also be brought in putting it in suspension in a volatile support as for example the methyl-cellulose, and be deposited on the junctions to be brazed, or on the whole heat exchangers, thus a thin coat of magnesium powder remains after evaporation of the volatile support.

As in the embodiments disclosed in the above IV and V, the increase of temperature required for melting the brazing alloy causes the putting in solution of the magnesium silicide and then, always as in the previous examples, the immediate cooling is made providing a tempering of the base alloy.

Brazing being performed without the presence of any flux, a washing and a rinsing operations are no longer required and consequently the cooling can be made only by blowing gas, though it can also be performed by spraying a liquid. Then after the heat exchangers have been cooled up to the ambient temperature, they are again submitted to a tempering operation described in detail in the above IV.

Whatever the way the above described processus is embodied it is important that the basic alloy has a high burning temperature to provide a temperature difference as large as possible between said burning temperature of the basic alloy and the melting temperature of said brazing alloy, being understood that burning temperature indicates the temperature for which starts a formation of an easily melted compound at the junction of grains of the surface coat of the basic alloy, said melting compound causing then a poor cohesion of said surface coat.

Practically, alloys which are satisfactory in this respect contain:

| | |
|---|---|
| magnesium | 0.3 to 0.8 % |
| silicon | 0.10 to 0.50 % |
| iron | ≤ 0.8 % |
| copper | ≤ 0.05 % |
| zinc | ≤ 0.30 % |
| manganese | ≤ 0.30 % |
| aluminium s.q.p. | 100 % |

It is very particularly important that the quantities of impurities, i.e., iron, zinc and manganese, be kept low and it is further desired that the traces of copper be as low as possible because it has been noticed in the considered application of the invention to heat exchangers that any presence of copper even in low proportion was considerably increasing the risks of corrosion and especially corrosion through pitting.

Alloys having the composition stated above have the particular characteristic that the total compound of magnesium silicide $Mg_2Si$ is dissolved in the aluminium of the basic alloy at the melting temperature of the brazing alloy because it is known that at 595°C, the solid aluminium can dissolve 1.85% of $Mg_2Si$ and at 500°C the quantity in solution is still of 1.05%. Yet, the binary compound Mg₂Si having, on one hand, a tendency to decrease the melting temperature of the alloy containing it, and on the other hand, the decrease of the quantity of compound Mg₂Si in the alloy having for its result to reduce the level of mechanical strength, it has then been prefered, when a high mechanical strength is desired at the same time as a high melting temperature, that the alloy contains:

| | |
|---|---|
| magnesium | 0.45 to 0.65 % |
| silicon | 0.37 to 0.47 % |
| iron | 0.20 % |
| copper | 0.02 % |
| zinc | 0.10 % |
| manganese | 0.10 % | in which the iron, copper, zinc and manganese are impurities that it could be desirable to eliminate but they are tolerated in order to avoid performing costly refining operations. Alloys having the above proportions have a melting temperature of 620°C and thus provide an easy performance of the brazing operations to be performed with brazing alloys AlSi.

In the case of a brazing with flux, the preferred brazing alloy has appeared to be that designated by AS 10 which contains 10% in weight of silicon and of which melting temperature is within the range of 577°C and 592°C. Actually, by maintaining thus the portion of the oven causing the brazing at a temperature of 590°C to 600°C, which can be easily controlled, a high quality braze is performed without any risk of burning the basic alloy and while being sure that all compound Mg₂Si is actually in solution in the aluminium of said basic alloy. Besides, since the brazing AS 10 alloy does not reach a level of fluidity as important as the brazing alloys containing more silicon, said brazing alloy limits the risks of a flow prejudicial to the good performance of the junctions.

In case of brazing without any flux, the presence of magnesium in the metallic form creates, with the aluminium-silicium alloy, a ternary alloy Al-Si-Mg which, when containing 5% in weight of magnesium, 13% in weight of silicium and 82% in weight of aluminium, forms an entectic alloy melting at 551°C which safety maintains the temperature of the oven between 580° and 590°C, or even a slightly lower temperature, while being sure of a good performance of the braze without any risk of burning the basic alloy in which the Mg₂Si compound is also completely dissolved.

For practically embodying this present invention as described in the above disclosure it is particularly advantageous to perform the successive operations during a continuous working cycle the heat exchangers being moved without any stoppage of their motion.

The invention is not restricted to the embodiments shown and described in detail, for various modifications thereof can moreover be applied to it without departing from the scope of the invention as shown in the appended claims.

I claim:

1. Method for manufacturing and brazing various apparatuses and particularly heat exchangers, wherein:
    the parts of the apparatus are made from thin sheets of a basic aluminium alloy containing silicon and magnesium able to form a magnesium silicide compound Mg₂Si;
    the apparatus is assembled and submitted to action of a cleaning solvent of the greasy products,
    the apparatus is heated in presence of an aluminium brazing alloy containing at least 7% and at most 15% of silicon in presence of metals and metal salts causing removal of the oxides covering the basic alloy and wetting thereof by the brazing alloy,
    the apparatus is heated to a temperature within the range of 580° to 600°C, whereby at a same time the magnesium silicide is completely set in a supersaturated state solution in the basic alloy keeping a solid state and the brazing alloy is melted and wets said basic alloy,
    as soon as wetting of said basic alloy by the brazing alloy is performed, the apparatus is quickly cooled at a speed of at least 1°C per second substantially up to the ambient temperature, whereby the magnesium silicide of said basic alloy is kept in supersaturation state while said brazing alloy is solidified and hardened,
    then the apparatus is again heated up to a temperature at least equal to 180°C and at most equal to 250°C up to the point to cause a temper causing the magnesium silicide to precipitate while providing an hardening of said basic alloy, and
    the apparatus is lastly cooled back to the ambient temperature, whereby the brazing of the parts constituting it is performed along with the heat treatment hardening the alloy constituting said apparatus.

2. Method as set forth in claim 1, wherein the proportion of silicon and magnesium comprised in the basic alloy is selected in such a way that all Mg₂Si binary system which is formed thereby is set in solution in the aluminium at the melting temperature of the brazing alloy, whereby the magnesium silicide forms with the aluminium a quasi-binary system at said brazing temperature and the magnesium silicide is entirely utilized as an hardening element upon precipitation thereof after a tempering step performed at the brazing end.

3. Method as set forth in claim 1, wherein magnesium silicide in the aluminium alloy is within the range of 0.3 to 1.9% in weight.

4. Method as set forth in claim 1, wherein the brazing alloy contains between 7 and 15% of silicon and preferably between 10 and 12%, whereby the melting temperature of said alloy is lower than 580°C, and wherein the basic alloy comprises between 0.30 and 0.80% of magnesium and 0.20 to 0.50% of silicon and preferably 0.45 to 0.65% of magnesium and 0.37 to 0.47% of silicon, whereby the melting temperature of said basic alloy is comprised between 615° and 625°C with a burning point higher than 600°C.

5. Method as set forth in claim 1, wherein the basic alloy comprises substantially no copper, the highest limit being lower than 0.05% in weight and preferably lower than 0.02% in weight.

6. Method as set forth in claim 1, wherein the assembled apparatuses are submitted after the degreasing operation to a cleansing operation by passing in an acid or alkaline bath then to a drying operation and a heating operation up to the brazing temperature.

7. Method as set forth in claim 1, wherein brazing is performed in presence of flux deposited through dipping, through wet spraying, through a dry spraying, and wherein a cooling step which follows immediately the brazing is quickly performed to cause both keeping in solution of the magnesium silicide in the basic alloy, quick solidification and hardening of the brazing alloy, and a heat shock causing removal of the flux from the portions covered by the flux; said apparatus having been cooled substantially up to the ambient temperature and then submitted to a washing operation in a hot acid bath and to a rinsing operation in an aqueous bath at a temperature slightly higher than temperature of the acid bath; whereby traces of flux are eliminated simultaneously with the progressive start of a tempering treatment through which the magnesium silicide is caused to precipitate in the basic alloy.

8. Method as set forth in claim 7, wherein the quick cooling following immediately the brazing step is performed by blowing gas up to a temperature close to 300°C, then by spraying liquid up to the ambient temperature, whereby the heat shock causing the removal of the flux occurs only at a temperature about 300°C thus eliminating the risks of deforming the parts of the apparatus.

9. Method as set forth in claim 7, wherein the quick cooling is performed by a liquid spraying according to a cycle causing a quick decrease of the basic alloy temperature, then a heat shock at a temperature about 300°C, said spraying being firstly performed in a very thin atomization form, then under a liquid form sprayed in increasing quantity, said liquid having an aqueous base and containing additives reducing heat absorption power of water.

10. Method as set forth in claim 1, wherein the brazing alloy contains additives, especially alkaline and alkaline-earth metals, to increase wetting of said alloy, whereby at least the cleaning operation preceeding the fluxing operation is no more required.

11. Method as set forth in claim 1, wherein brazing is performed without flux, the apparatuses being raised at a temperature within 600°C in presence of magnesium in metal form brought through diffusion under vacuum, through pulverulent form, through suspension in a volatile support, or as additive to the brazing alloy then comprising up to 15% of silicon and 5 to 10% of magnesium to form a ternary alloy having a melting point of about 550°C, the brazing operation being then performed under a vacuum close to $10^{-4}$ mm of mercury or under a neutral atmosphere.

12. Method as set forth in claim 7, wherein the tempering treatment is made in a stove at a temperature between 180° and 240°C.

13. Method as set forth in claim 7, wherein the tempering treatment is performed together with drying the apparatuses when they have been submitted to the washing operation.

14. Method as set forth in claim 7, wherein the tempering treatment is performed in two steps, a first one consisting in a slow temperature increase up to a point comprised between 180° and 240°C and a second one consisting in keeping the apparatuses at the temperature point to which said apparatuses have been raised.

15. Method as set forth in claim 14, wherein the first step of the tempering treatment is performed within a time interval comprised between 20 and 60 minutes.

16. Method as set forth in claim 14, wherein the second step of the tempering treatement is performed at a temperature within the range of 210° to 225°C for a period of 15 to 30 minutes.

17. Method as set forth in one of claim 1, wherein the sheets of basic alloy are submitted, before forming the parts, to at least one work-hardening followed by a heat treatment of at least partial restoration performed at a temperature between 250° and 290°C and during a time in relation with a type of mechanical work said sheets have to stand.

18. Method as set forth in claim 1, wherein the brazing alloy is selectively brought on the sheets of basic alloy through plating upon the manufacturing of said sheets or brought furtherly through bringing the brazing alloy in the form of mixture, or powder especially sprayed with a flame blow-pipe simultaneously with a spraying of an anhydrous flux.

19. Method as set forth in claim 1, wherein the brazing alloy contains no copper.

* * * * *